United States Patent
Maeshiba

[15] 3,703,830
[45] Nov. 28, 1972

[54] DIRECT-READING GASOLINE METER WITH BOB AND FLOAT CONTROL OF MEASURING TAPE

[72] Inventor: Sozaburo Maeshiba, 33-32, 4-chome, Hakataekimae, Fukuoka, Fukuoka Prefecture, Japan

[22] Filed: Sept. 11, 1970

[21] Appl. No.: 71,618

[52] U.S. Cl. .................................................. 73/321
[51] Int. Cl. ............................................. G01f 23/08
[58] Field of Search ............................................ 73/321

[56] References Cited

UNITED STATES PATENTS

| | | |
|---|---|---|
| 1,933,522 | 10/1933 | Edwards ..................... 73/321 |
| 1,967,631 | 7/1934 | Schweizer .................... 73/321 |
| 2,216,035 | 9/1940 | Lang .......................... 73/321 |
| 2,637,111 | 5/1953 | McDuff ..................... 73/321 X |
| 1,483,131 | 2/1924 | Tausz et al. ................. 73/321 |

Primary Examiner—Louis R. Prince
Assistant Examiner—Daniel M. Yasich
Attorney—Robert E. Burns and Emmanuel J. Lobato

[57] ABSTRACT

A direct-reading meter for measuring the contents of gasoline tanks and the like with a direct-reading tape controllably payed out and taken up by a take-up spool under control of a bob suspended on a chain. The meter is used to convert existing stick or rod measuring systems to direct reading.

4 Claims, 5 Drawing Figures

DIRECT-READING GASOLINE METER WITH BOB AND FLOAT CONTROL OF MEASURING TAPE

This invention relates generally to meters for reading the contents of gasoline tanks and more particularly to direct-reading meters.

Gasoline stations having buried or underground gasoline storage tanks for their gasoline pumps must constantly maintain an inventory of the amount or quantity of gasoline within individual underground tanks. The known installations consist of a buried gasoline tank having an upstanding pipe or conduit through which a measuring stick is lowered into the tank and a reading of the height or level of the gasoline taken and then the amount of fuel computed therefrom or directly read therefrom if the stick is properly calibrated. These known installations generally have an upstanding pipe connected to the tank which is of relative small diameter, for example one or two inches in diameter, in order to maintain a safe connection to the tank. Direct reading meters are known but these generally require a different arrangement than the arrangement above described.

It is a principal object of the present invention to provide a direct-reading meter for converting stick-measured installations of tanks to direct-reading systems by simply mounting the meter according to the invention on the existing construction.

Another object is to provide a direct-reading meter which can be readily installed for converting known systems and has an improved structure for avoiding corrosion of a measuring tape thereon.

The direct-reading meter in accordance with the invention is provided with a take-up spool on which is wound a measuring tape having a free end and extending through a conduit connected to a gasoline tank on which the meter is mounted. A float on the free end of the measuring tape floats on the surface of the liquid or gasoline in the tank and senses the level thereof and accordingly the tape is payed out or taken up and coiled on the spool in dependence upon the varying of the level of gasoline within the tank. The take-up spool is provided with a bob and chain connected thereto that controllably allows the paying out of the tape or take-up thereof.

A tension roll is provided in the meter that applies tension to the tape to keep it taut for direct and accurate reading of the indicia thereon through a viewing port or window in the meter. The take-up roll is provided with a first peripheral groove of wider width than the width of the measuring tape and a second peripheral groove within the first-mentioned groove of lesser width than the tape. The measuring tape overlies the narrower second peripheral groove when disposed within the wider groove of the tension roll. This construction reduces corrosion and attack of the measuring tape.

Other features and advantages of the direct reading meter in accordance with the invention will be better understood in conjunction with the following description and appended claims and drawings in which:

While the direct-reading meter will be described as applied to measuring the contents of a gasoline tank it will be understood that the principles of the meter according to the invention can be used for other applications and in other environments. The direct-reading meter is particularly applicable to installations where corrosive liquids and their fumes may be encountered and for converting stick or rod measuring installations to direct-reading installations.

Figure 1:
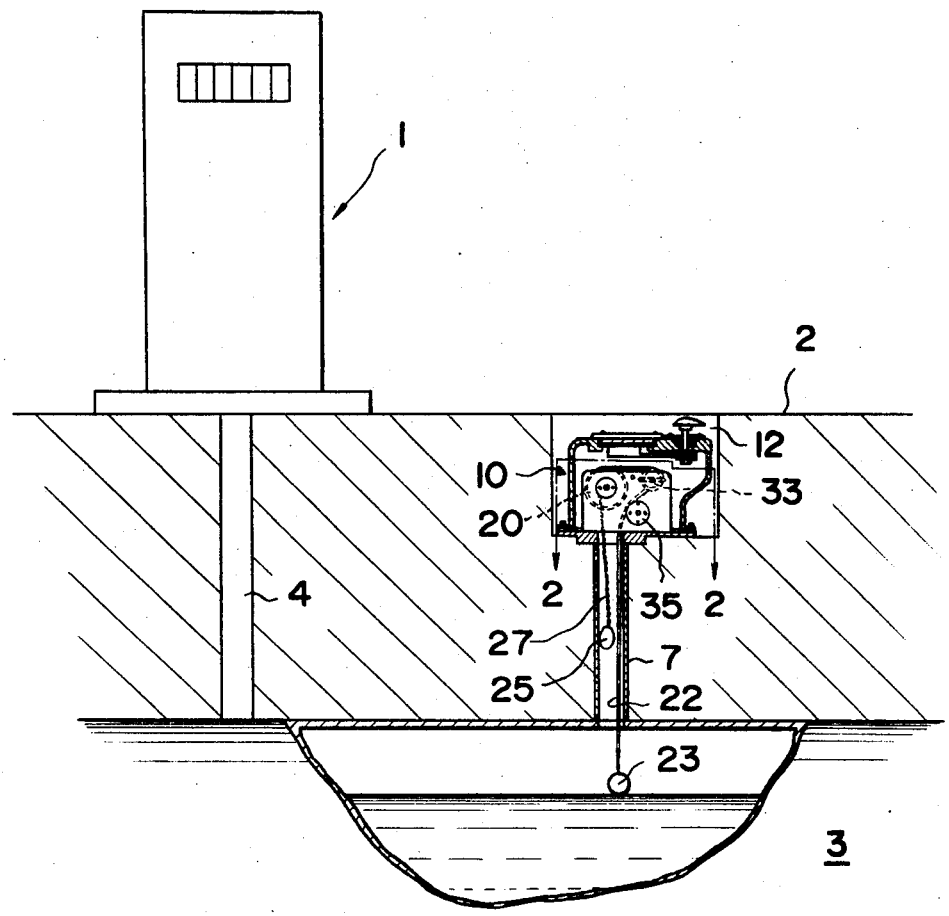
FIG. 1 is a diagrammatic view partly in cross-section of a gasoline tank installation provided with a direct-reading meter in accordance with the invention.
Figure 2:
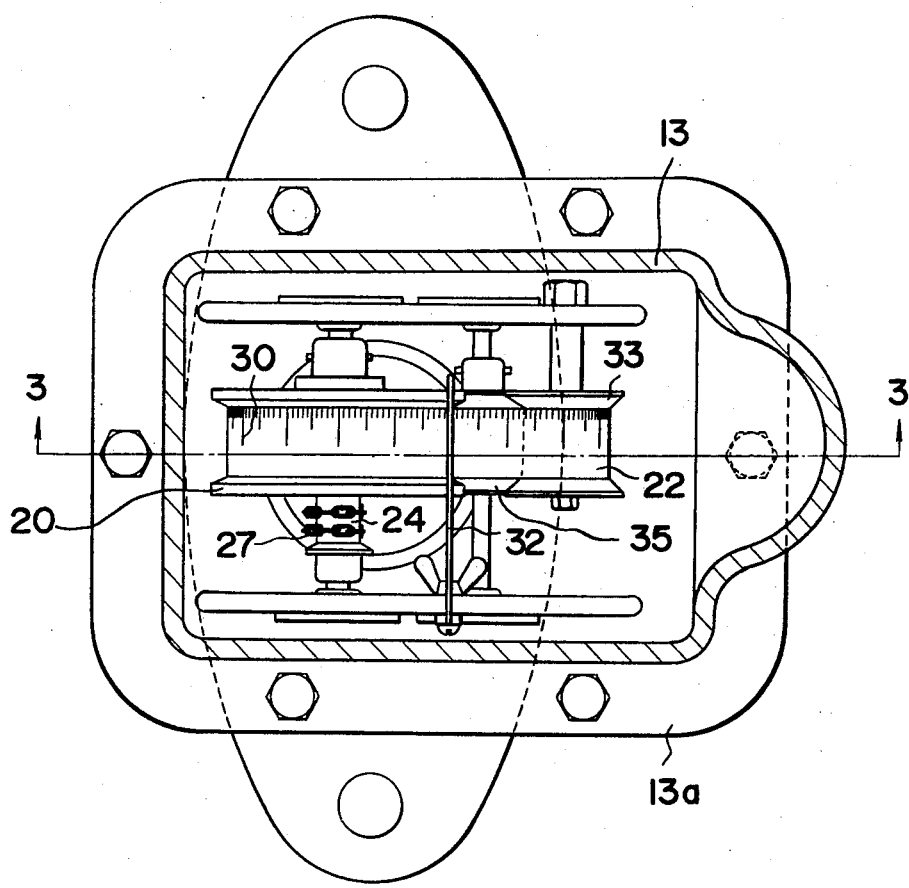
FIG. 2 is a cross-section view taken along section line 2—2 of FIG. 1.

In accordance with the drawing as illustrated in FIG. 1 a gasoline station having a gasoline pump 1 above the grade 2 has a gasoline tank 3 underground. The gasoline pump is provided with a conduit connection 4 for taking a suction on the contents of the gasoline tank 3. The tank is provided with an upstanding conduit 7 generally of one or two inches in diameter. It can be seen that if a larger pipe is to be used, particularly if the installation is under concrete, there is a considerable amount of expense to change the upstanding pipe in an installation of this type.

Figure 3:
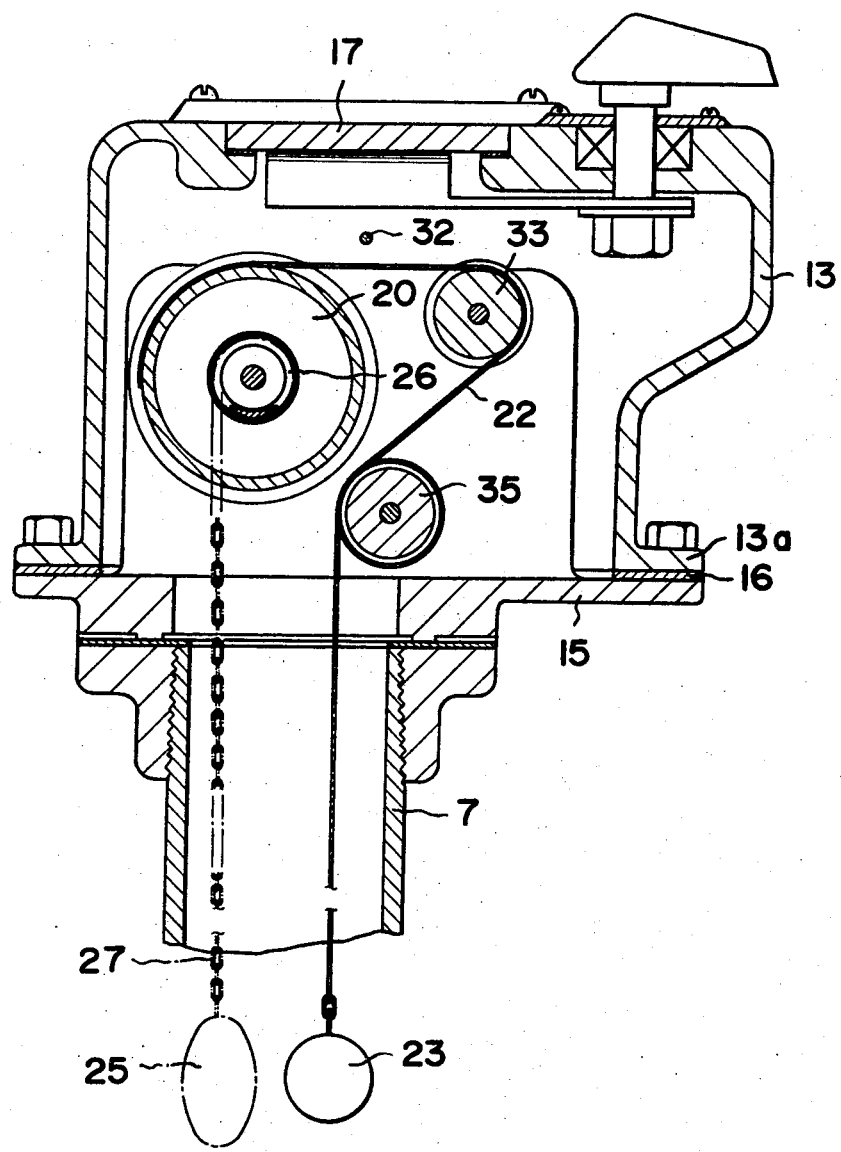
FIG. 3 is a fragmentary cross-section view taken along section line 3—3 of FIG. 2.
Figure 4:
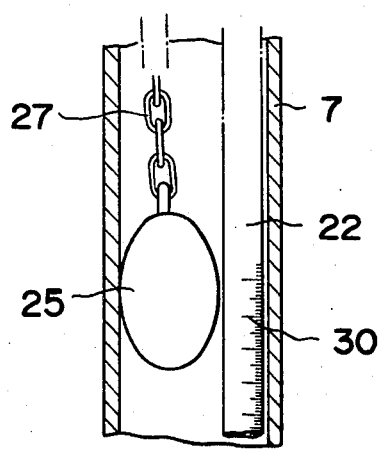
FIG. 4 is a fragmentary cross-section view on an enlarged scale of a part of the meter illustrated in FIG. 1.

According to the invention a direct-reading meter 10 is provided for installation on the upstanding conduit 7 within a vault 12. The direct-reading meter 10 comprises a housing 13 provided with a threaded base 15 connected to a thread on the conduit 7 as illustrated in FIGS. 1 and 3. The threaded base is constructed as a threaded coupling and the housing 13 is removably mounted thereon with bolts through a flange 13a and a fluid-tight construction is maintained with a gasket 16. The housing is provided with an inspection or reading port or window covered with a glass 17 so that the meter can be read therethrough as later described.

The meter is provided with a rotatably mounted take-up spool 20 on which is coiled a flexible tape 22, for example a flexible metallic tape, having one end fixed to the spool and a free end provided with a float 23. The tape extends downwardly through the upstanding conduit when the meter is in use and the float floats on the surface of the gasoline and senses the liquid level as this level changes and the surface rises towards or recedes away from the meter. The tape is controllably payed out and taken-up under the control of a bob 25 suspended on a reel 26 on one end of the take-up spool. The bob and the suspension means for the bob, comprising a chain 27 wound on the reel 26 on the take-up spool, apply a force in the direction for controllably paying out the tape as the float moves downwardly. The bob 25 is suspended within the upstanding conduit 7 as illustrated in FIG. 1 so as to press the flexible tape 22 slightly to prevent the chain 27 and the tape from entwining.

The tape is suitably provided with a scale 30 having suitable graduations or indicia that indicate the level of the contents. It being understood that the graduations may read directly in gallons or may be a reading in feet and inches from which a gallon content may be computed. A reference or index 32 is provided so that as the tape is viewed through the port or window a direct-reading is immediately taken.

Figure 5:
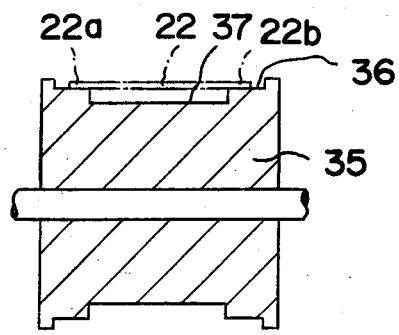
FIG. 5 is a fragmentary cross-section view on an enlarged scale of a tension roll of the apparatus illustrated in FIG. 1.

The meter is provided with a guide roller 33 and a tension roller or roll 35 for maintaining the measuring tape taut so that an accurate reading is taken. The tension roller is constructed as illustrated in FIG. 5. It has a first peripheral groove 36 which is wider than the tape and through which the tape extends. A second peripheral groove 37 is provided on the tension roll in communication with the first mentioned peripheral groove an opening on to the periphery of the roll. This second peripheral groove is of lesser width than the tape and the measuring tape overlies it.

Thus, any gas fumes that may escape through the conduit 7 and condense are allowed to drip down into the tank without making contact with the tape. The tape itself is supported along narrow edge portions 22a, 22b as illustrated in FIG. 5 so that the indicia thereon is subjected to a minimum of damage and the tape is not corroded as read-ily as it might be by the condensed fumes.

What we claim and desire to secure by letters patent is:

1. A direct-reading meter for measuring the quantity of liquid in a tank having a vertical conduit extending up from the interior of the tank, comprising a housing fixed on the upper end of said conduit and having a window, a take-up spool rotatably mounted in said housing, a flexible tape wound on said spool and having one end fixed to said spool and the other end extending down through said conduit into the tank, a float on said other end of said tape, a guide roller engaging said tape to guide it into the upper end of said conduit, said tape having indicia on the outer surface thereof viewable through said window, a reel of smaller diameter than said spool fixed coaxially on one end of said spool and rotatably therewith, a flexible tension line wound on said reel and having one end fixed to said reel, the other end extending down into said conduit, a weight disposed in said conduit and attached to said other end of said tension line, said weight acting through said tension line and said reel on said spool to tend to turn said spool in a direction to wind said tape thereon, said float floating on liquid in said tank and exerting a force on said tape to unwind said tape from said spool an amount depending on the level of liquid in the tank and thereby move said weight up or down, said weight being guided in its movement by said conduit to avoid fouling of said tape by said tension line, and the amount of liquid in the tank being indicated by said indicia on said tape viewed through said window, said guide roller engaging the outer surface of said tape and having a periphery that is circumferentially recessed so as to engage only edge portions of said tape and not said indicia.

2. A direct-reading meter according to claim 1, in which a second guide roller engaging the inner surface of said tape is disposed with its periphery at approximately the same level as the periphery of said spool to provide an approximately horizontal run of said tape between said spool and second guide roller in position to be viewed through said window.

3. A direct-reading meter according to claim 1, in which said tension line is a link chain.

4. A direct-reading meter for measuring the quantity of liquid in a tank having a vertical conduit extending up from the interior of the tank, comprising a housing fixed on the upper end of said conduit and having a window, a take-up spool rotatably mounted in said housing, a flexible tape wound on said spool and having one end fixed to said spool and the other end extending down through said conduit into the tank, a float on said other end of said tape, said tape having indicia on its outer surface, a first guide roller engaging the inner surface of said tape and disposed with its periphery at approximately the same level as the periphery of said spool to provide an approximately horizontal run of said tape between said spool and said guide roller in position for indicia on said tape to be viewed through said window, a second guide roller engaging said tape to guide it into the upper end of said conduit, a reel of smaller diameter than said spool fixed coaxially on one end of said spool and rotatable therewith, a flexible tension line wound on said reel and having one end fixed to said reel, the other end extending down into said conduit, a weight disposed in said conduit and attached to said other end of said tension line, said weight acting through said tension line and said reel on said spool to tend to turn said spool in a direction to wind said tape thereon, said float floating on liquid in said tank and exerting a force on said tape to unwind said tape from said spool an amount depending on the level of liquid in the tank and thereby move said weight up or down, said weight being guided in its movement by said conduit to avoid fouling of said tape by said tension line, and the amount of liquid in the tank being indicated by said indicia on said tape viewed through said window.

* * * * *